(12) United States Patent
Krajnovich (10) Patent No.: US 7,724,473 B1
(45) Date of Patent: May 25, 2010

(54) SLIDER WITH ACTUATOR-TRANSDUCER SEPARATION AND ROLL ACTIVATION

(75) Inventor: Douglas J. Krajnovich, Santa Clara, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1059 days.

(21) Appl. No.: 11/031,941

(22) Filed: Jan. 7, 2005

Related U.S. Application Data (60) Provisional application No. 60/566,541, filed on Apr. 29, 2004.

(51) Int. Cl.
*G11B 21/20* (2006.01)
(52) U.S. Cl. .................. 360/235.4; 360/236; 360/236.6
(58) Field of Classification Search ............. 360/234.3, 360/235.1–235.9, 236, 236.1–236.9, 237, 360/237.1, 294.7
See application file for complete search history.

(56) References Cited

U.S. PATENT DOCUMENTS

| | | | | |
|---|---|---|---|---|
| 5,276,573 A * | 1/1994 | Harada et al. ............. | 360/235.3 |
| 5,313,352 A * | 5/1994 | Chikazawa et al. ....... | 360/294.7 |
| 5,764,432 A * | 6/1998 | Kasahara ................... | 360/75 |
| 5,862,015 A | 1/1999 | Evans et al. | |
| 5,880,899 A | 3/1999 | Blachek et al. | |
| 5,959,801 A | 9/1999 | Gillis et al. | |
| 5,965,840 A | 10/1999 | Nagarajan et al. | |
| 5,991,113 A * | 11/1999 | Meyer et al. ............... | 360/75 |
| 6,011,239 A | 1/2000 | Singh et al. | |
| 6,195,219 B1 | 2/2001 | Smith | |
| 6,452,740 B1 | 9/2002 | Ghoshal | |
| 6,590,744 B1 * | 7/2003 | Ohuchi et al. ............. | 360/234.7 |
| 6,597,539 B1 * | 7/2003 | Stupp et al. ............... | 360/245.7 |
| 6,600,635 B2 * | 7/2003 | Smith ......................... | 360/294.7 |
| 6,963,464 B2 * | 11/2005 | Xu et al. ...................... | 360/75 |
| 6,972,919 B2 * | 12/2005 | Suk ............................. | 360/75 |
| 2002/0024774 A1 * | 2/2002 | Berger et al. .............. | 360/294.7 |
| 2002/0057532 A1 * | 5/2002 | Kurita et al. .............. | 360/234.7 |
| 2002/0067565 A1 | 6/2002 | Kelemen | |
| 2002/0126416 A1 * | 9/2002 | Smith ......................... | 360/128 |
| 2002/0141113 A1 * | 10/2002 | Kang et al. ................. | 360/236.5 |
| 2003/0011932 A1 * | 1/2003 | Mei et al. .................... | 360/234.3 |
| 2003/0035237 A1 * | 2/2003 | Lille .......................... | 360/77.07 |
| 2003/0151854 A1 * | 8/2003 | Lee ............................. | 360/234.6 |
| 2003/0174430 A1 | 9/2003 | Takahashi et al. | |
| 2004/0174638 A1 * | 9/2004 | Pendray et al. ........... | 360/235.7 |

OTHER PUBLICATIONS

U.S. Appl. No. 10/211,671, filed Aug. 2, 2002, McKenzie et al.

* cited by examiner

*Primary Examiner*—William J Klimowicz
*Assistant Examiner*—Carlos E Garcia
(74) *Attorney, Agent, or Firm*—Campbell Nelson Whipps LLC (57) ABSTRACT

A disk drive includes a rotatable storage disk, a suspension, and a slider assembly. The slider assembly includes a slider body, a read/write head that magnetically interacts with the storage disk, and a slider mover. The slider body is secured to the suspension in a fashion that allows the slider body to roll. The slider mover selectively rolls the slider body in a controlled fashion. With this design, the slider mover selectively rolls the slider body to control a head-to-disk spacing of the read/write head. Further, the slider body can have a roll axis and the read/write head and the slider mover can be positioned on opposite sides of the roll axis.

36 Claims, 4 Drawing Sheets

SLIDER WITH ACTUATOR-TRANSDUCER SEPARATION AND ROLL ACTIVATION

RELATED APPLICATION

This Application claims priority on U.S. Provisional Application Ser. No. 60/566,541 filed on Apr. 29, 2004 and entitled "Thermal Fly-Height Adjust Slider with Large Heater-Transducer Separation and Roll Activation". The contents of U.S. Provisional Application Ser. No. 60/566,541 are incorporated herein by reference.

BACKGROUND

Disk drives are widely used in computers, consumer electronics and data processing systems for storing information. The disk drive typically includes one or more storage disks and one or more slider assemblies. Each slider assembly includes a read/write head that transfers information to and from the storage disk. Rotation of the storage disk causes the slider assembly to ride on an air bearing with the read/write head spaced apart from the storage disk a distance that is commonly referred to as a "head-to-disk spacing".

Because today's disk drives utilize storage disks having increasingly high densities of data tracks, decreasing the head-to-disk spacing has become of great importance. However, this desire for a very small head-to-disk spacing must be balanced with tribological concerns in order to avoid damage to the read/write head and/or the storage disk, as well as loss of data.

Maintaining a relatively small and consistent head-to-disk spacing is further complicated by other factors. In particular, the read/write head includes a write element. During a write operation, the electrical resistance in the write element generates heat in and around the read/write head. The heat causes thermal expansion of portions of the slider assembly toward the storage disk, known as write pole tip protrusion ("WPTP"). In addition, environmental temperature increases within the disk drive can also result in environmental pole tip protrusion ("EPTP") toward the storage disk. If pole tip protrusion is excessive, the slider assembly can unintentionally contact the storage disk ("head-to-disk contact"), causing off-track writing, degraded data transfer rates, damage to the slider assembly, damage to the storage disk and/or a permanent loss of data.

Conversely, a temperature decrease in the drive will induce the opposite effect on the EPTP—the pole tips will retract from the disk. Such retraction can degrade the performance of the reading and writing process since larger spacing can generally degrade the information transfer to and/or from the disk.

SUMMARY

The present invention is directed to a disk drive that includes a rotatable storage disk, a suspension, a slider assembly, and a drive circuitry. In one embodiment, the slider assembly includes a slider body, a read/write head that magnetically interacts with the storage disk, and a slider mover. Further, the slider body is secured to the suspension in a fashion that allows the slider body to roll about a roll axis. In one embodiment, the drive circuitry controls the slider mover to selectively roll the slider body in a controlled fashion between a first position and a second position. With this design, in certain embodiments, the slider mover can be used to move and position the slider body to control a head-to-disk spacing of the read/write head.

In one embodiment, the slider mover is spaced apart a separation distance from the read/write head that is relatively large. Further, the slider mover and the read/write head can be positioned on opposite sides of a roll axis of the slider body. Further, the slider mover and the read/write head are positioned away from the roll axis. In this embodiment, the slider body includes a R/W bearing surface and a spaced apart mover bearing surface, and the read/write head is positioned near the R/W bearing surface and the mover is positioned near the mover bearing surface. In one embodiment, activation of the slider mover causes a controlled deformation of the mover bearing surface. During rotation of the storage disk, deformation of the mover bearing surface increases the lift forces generated by the mover bearing surface. Because, the mover bearing surface is offset from the roll axis, the increased lift forces causes a moment on the slider body that rolls the slider body.

The present invention also includes a method for adjusting a head-to-disk spacing in a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
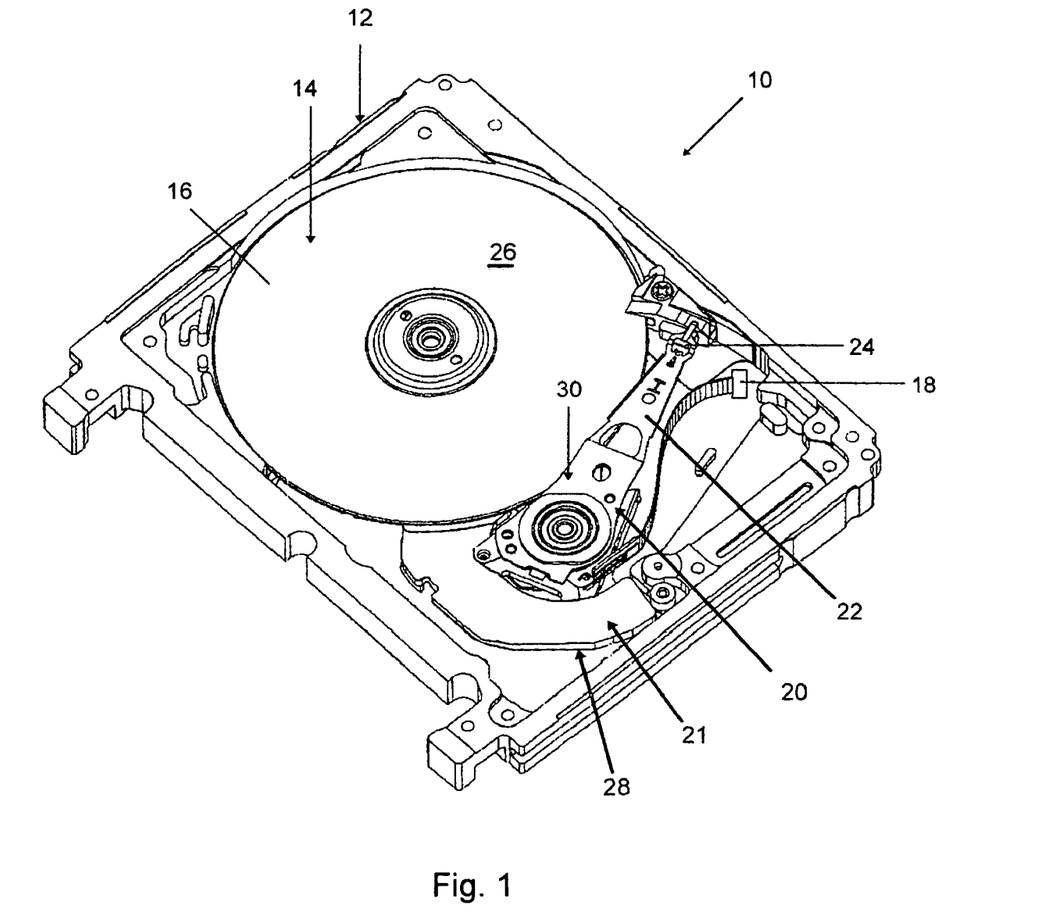
FIG. 1 is a perspective view of a disk drive having features of the present invention.

FIG. 1 illustrates a perspective view of a disk drive 10 that includes (i) a drive housing 12, (ii) a disk assembly 14 having one or more storage disks 16, (iii) a drive circuitry 18, and (iv) a head stack assembly 20 including an actuator assembly 21 and one or more head suspension assemblies 22, with each head suspension assembly 22 including a slider assembly 24.

Each storage disk 16 includes one or more disk surfaces 26 that each has a plurality of concentric data tracks (not shown) that store data, including a target track. Once the slider assembly 24 stabilizes over the target track, data is read from the storage disk 16 during a read operation or data is transferred to the storage disk 16 during a write operation.

The drive circuitry 18 sends and/or receives electrical current from the slider assembly 24 during read and/or write operations of the disk drive 10. Moreover, the drive circuitry 18 can control several additional functions within the disk drive 10. For example, the drive circuitry 18 can direct current to the slider assembly 24 to dynamically adjust and control the spacing between portions of the slider assembly 24 and the storage disk 16. The drive circuitry 18 can include a processor and one or more preamplifiers.

The head stack assembly 20 illustrated in FIG. 1 includes an actuator motor 28, one head suspension assembly 22, and one actuator arm 30. The head suspension assembly 22 is secured to the actuator arm 30, and supports the slider assembly 24 near one of the disk surfaces 26 of the storage disk 16 during operation of the disk drive 10. The actuator motor 28 moves the actuator arm 30 and the head suspension assembly 22 relative to the storage disk 16. The head stack assembly 20 can alternatively include a plurality of actuator arms 30 that each supports up to two head suspension assemblies 22.

The slider assembly 24 transfers information between the drive circuitry 18 and the storage disk 16.

Figure 2:
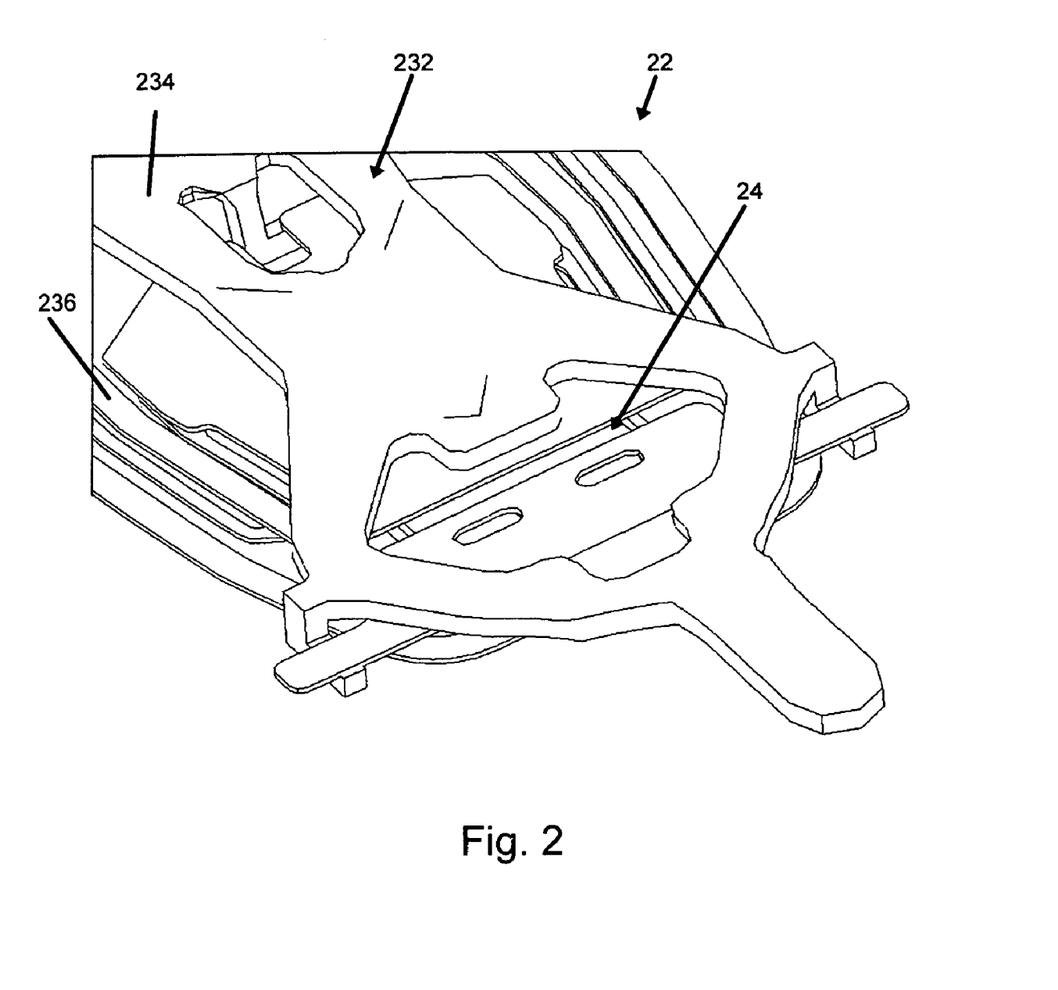
FIG. 2 is a top perspective view of a head suspension assembly having features of the present invention.

FIG. 2 is a top perspective view of one embodiment of the head suspension assembly 22. In this embodiment, the head suspension assembly 22 includes the slider assembly 24 and a suspension 232 that supports the slider assembly 24. The suspension 232 includes a load beam 234 and a flexure 236. The load beam 234 is attached to the actuator arm 30 (illustrated in FIG. 1). The load beam 234 includes a slider contact 462 (illustrated in FIG. 4A) that engages the slider assembly 24. As an example, the slider contact 462 can be a dimple in the load beam 234. The load beam 234 is flexible in a direction perpendicular to the storage disk 16 and acts as a spring for supporting the slider assembly 24. The flexure 236 flexibly attaches the slider assembly 24 to the load beam 234 and urges the slider assembly 24 against the slider contact 462. With this design, as described below, the slider assembly 24 can pivot relative to the slider contact 462. The load beam 234 and flexure 236 can be formed from a metallic material such as stainless steel or other suitable materials.

In an alternative embodiment, the load beam 234 and the flexure 236 can be formed as an integral, unitary structure that can utilize homogeneous or non-homogeneous materials.

Figure 3A:
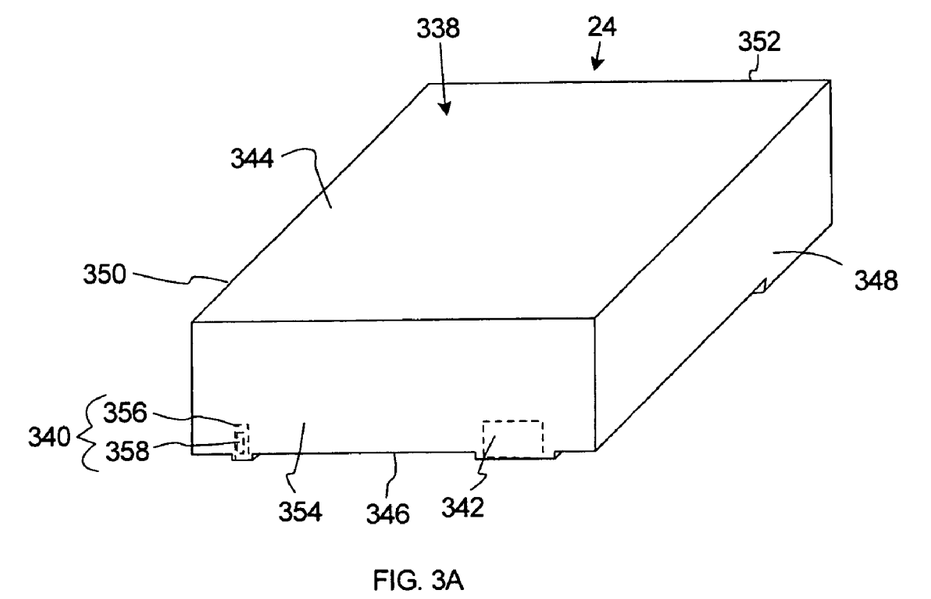
FIG. 3A is a top perspective view of one embodiment of a slider assembly having features of the present invention.

FIG. 3A is a simplified, top perspective view of one embodiment of the slider assembly 24. In this embodiment, the slider assembly 24 includes a slider body 338, a read/write head 340 (illustrated in phantom) that transfers data to or from the storage disk 16 (illustrated in FIG. 1), and a slider mover 342 (illustrated as a box in phantom) that causes the slider body 338 to move or pivot. The design and configuration of these components can be varied depending upon the requirements of the disk drive 10.

In FIG. 3A, the slider body 338 is generally rectangular shaped and includes a backside 344, an opposed flying side 346 that faces the storage disk 16, an ID side 348 that faces an axis of rotation for the storage disk 16, an OD side 350 that is opposite the ID side 348, a leading edge 352, and a trailing edge 354 that is opposite the leading edge 352. The composition of the slider body 338 can vary. In one embodiment, portions of the slider body 338 can be formed from materials such as alumina titanium carbide ceramic, for example.

In this embodiment, the read/write head 340 and the slider mover 342 are spaced apart from each other and are each positioned within the slider body 338 near the trailing edge 354. Further, the read/write head 340 includes a write element 356 (illustrated as a box) that writes data to the storage disk 16 during a write operation and a read element 358 (illustrated as a box) that reads data from the storage disk 16 during a read operation.

Figure 3B:
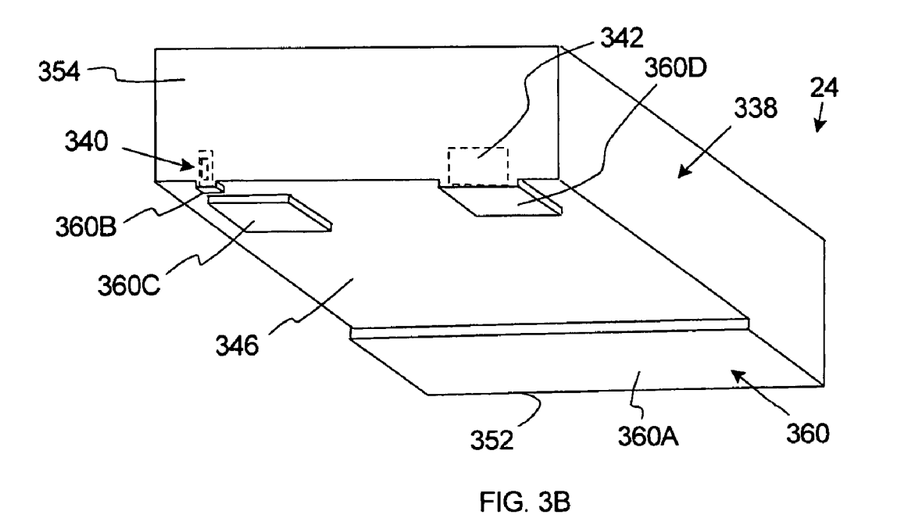
FIG. 3B is a bottom perspective view of the slider assembly of FIG. 3A.

FIG. 3B is a simplified, bottom perspective view of the slider assembly 24. In this embodiment, the flying side 346 includes one or more spaced apart bearing surfaces 360 that provide lift to the slider assembly 24. More specifically, rotation of the storage disk 16 (illustrated in FIG. 1) causes the slider assembly 24 to ride on a fluid supported journal bearing relative to the bearing surfaces 360 so that the read/write head 340 is spaced apart a distance from the storage disk 16 that is commonly referred to as a "head-to-disk spacing".

The number, design, shape, and characteristics of the bearing surfaces 360 can be varied to change the flying characteristics, the landing characteristics, the take-off characteristics, and/or performance of the slider assembly 24. In the embodiment illustrated in FIG. 3B, the slider body 338 includes (i) a front bearing surface 360A positioned near the leading edge 352, (ii) a R/W bearing surface 360B positioned near the trailing edge 354, (iii) an additional bearing surface 360C positioned near the R/W bearing surface 360B and the trailing edge 354, and (iv) a mover bearing surface 360D positioned near the trailing edge 354 that is spaced apart from the R/W bearing surface 360B. Further, the read/write head 340 is positioned near the R/W bearing surface 360B and the slider mover 342 is positioned near the mover bearing surface 360D.

In one embodiment, the mover bearing surface 360D has a larger surface area than the R/W bearing surface 360B and the mover bearing surface 360D produces more lift than the R/W bearing surface 360B. In alternative, non-exclusive embodiments, the surface area of the R/W bearing surface 360B is at least approximately 10, 20, 50, 75, 90, 95, or 99 percent smaller than the surface area of the Mover bearing surface 360D. Further, in alternative, non-exclusive embodiments, the R/W bearing surface 360B produces at least approximately 10, 20, 50, 75, 90, 95, or 99 percent less lift than Mover bearing surface 360D.

With this design, changes in the shape of the mover bearing surface 360D produces a larger change in the lift than changes in the shape of the R/W bearing surface 360B. The importance of this feature will be explained below.

In one embodiment, the additional bearing surface 360C is sized and shaped to provide lift to compensate for the relatively small size of the R/W bearing surface 360B.

Alternatively, the slider body 338 can include fewer or more bearing surfaces 360 and the bearing surfaces 360 can be alternatively located and/or shaped.

Figure 4A:
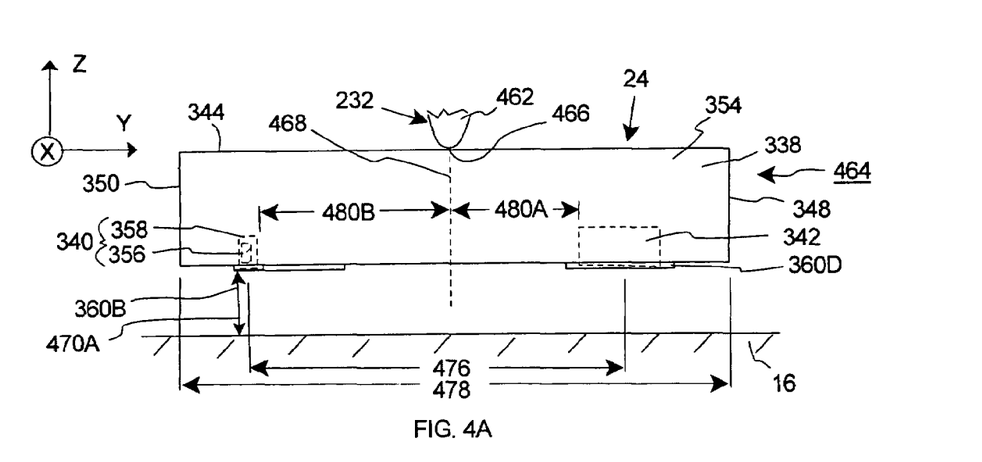
FIG. 4A is a simplified end view of a portion of a storage disk, a portion of a suspension, and one embodiment of a slider assembly having features of the present invention with the slider assembly in a first position.

FIG. 4A is a simplified end view of a portion of the storage disk 16, the slider contact 462 of the suspension 232, and the slider assembly 24 with the slider assembly 24 in a first position 464. In this embodiment, the slider assembly 24 is attached to the suspension 232 in a fashion that allows the slider assembly 24 to pivot and move about a roll point 466 where the slider contact 462 engages the slider body 338. The roll point 466 at which the slider contact 462 engages the slider body 338 defines a roll axis 468 of the slider body 388. With this configuration, movement of the ID side 348 along the Z axis away from the storage disk 16 generally results in pivoting of the slider body 338 about the roll point 466 and movement of the OD side 350 along the Z axis towards the storage disk 16. Similarly, movement of the ID side 348 along the Z axis towards the storage disk 16 generally results in pivoting of the slider body 338 about the roll point 466 and movement of the OD side 350 along the Z axis away from the storage disk 16. This type of side to side motion is commonly referred to as "roll" of the slider body 338. As used herein, the term "roll" shall mean and include motion of the slider body 338 about the roll point 466 or the roll axis 468.

The position of the roll axis 468 will vary according to the design of the suspension 232. For example, the slider contact 462 can engage the slider body 338 intermediate the ID side 348 and the OD side 350. With this design, the roll axis 468 extends substantially parallel to and intermediate the ID side 348 and the OD side 350.

In FIG. 4A, the slider contact 462 is centrally located and engages the backside 344 of the slider body 338 approximately halfway between the ID side 348 and the OD side 350, and the roll axis 468 extends approximately halfway between the ID side 348 and the OD side 350. Alternatively, for example, the suspension 232 can be designed so that the slider contact 462 engages the slider body 338 closer to the ID side 348 than the OD side 350, or closer to the OD side 350 than the ID side 348.

Further, in FIG. 4A, the slider contact 462 engages the backside 344 of the slider body 338 approximately half way between the leading edge (not shown in FIG. 4A) and the trailing edge 354. With this configuration, movement of the leading edge along the Z axis away from the storage disk 16 generally results in pivoting of the slider body 338 about the roll point 466 and movement of the trailing edge 354 along the Z axis towards the storage disk 16. This type of edge to edge motion is commonly referred to as "pitch" of the slider body 338. It should be noted that during operation of the disk drive 10, the slider body 338 is pitched with the leading edge farther away from the storage disk 16 than the trailing edge 354.

As provided herein, the slider mover 342 precisely rolls and positions the slider body 338 in a controlled fashion about the roll point 466 to precisely adjust the head-to-disk spacing 470A of the read/write head 340. Stated another way, in certain embodiments, the present invention utilizes a teeter-totter type configuration to precisely adjust the head-to-disk spacing 470A mainly by a roll motion of the slider body 338.

Figure 4B:
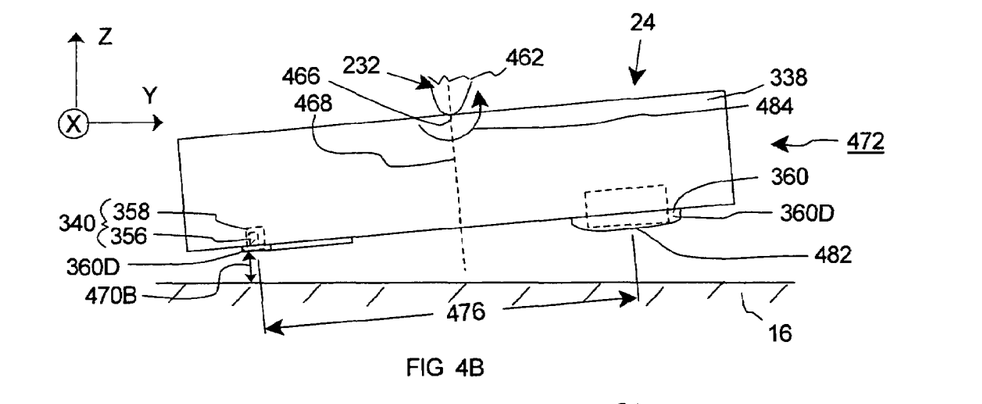
FIG. 4B is a simplified end view of the portion of the storage disk, the portion of the suspension and the slider assembly of FIG. 4A with the slider assembly rolled to a second position.
Figure 4C:
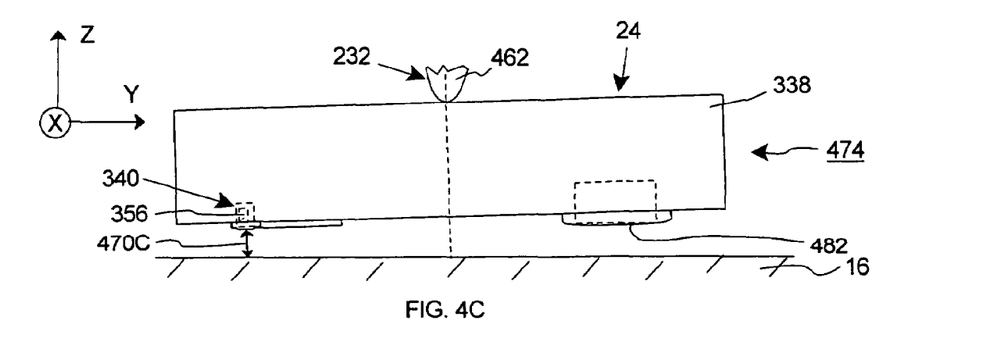
FIG. 4C is a simplified end view of the portion of the storage disk, the portion of the suspension and the slider assembly of FIG. 4A with the slider assembly rolled to a third position.

As an example, the slider mover 342 can be used to precisely move the slider body 338 between a plurality of alternative positions, including the first position 464, a second position 472 (illustrated in FIG. 4B), and a third position 474 (illustrated in FIG. 4C). The orientation of slider body 338 in each of these positions can be varied. For example, the first position 464 can be an initial position (D1) during rotation of the disk 16 in which the lift forces generated by the bearing surfaces 360 urge the slider assembly 24 away from the disk 16 and the suspension 232 urges the slider assembly 24 towards the disk 16. In the initial position (D1), the head-to-disk spacing 470 is relative large, and the slider body 338 is not rolled, e.g. the spacing between the OD side 350 and the disk 16 is approximately equal to the spacing between the ID side 348 and the disk 16.

As a non-exclusive example, at the first position 464, the head-to-disk spacing 470A can be between approximately 3 and 30 nanometers. In one embodiment, in this position 464, for example, the slider mover 342 is not activated and there is no data being transferred between the read/write head 340 and the storage disk 16. Further, because the head-to-disk spacing 470A is relative large, the likelihood of head-to-disk contact is reduced.

It should be noted that in certain embodiments, the slider mover 342 can not increase the head-to-disk spacing 470A from the initial position. Accordingly, in these embodiments, the disk drive 10 should be designed so that the initial head-to-disk spacing 470A is slightly larger to provide a range of actuation for the slider mover 342 to adjust the head-to-disk spacing 470A.

The location of the read/write head 340, and the slider mover 342 can be varied according to the design of the slider mover 342 and to achieve the desired actuation levels of the slider mover 342. FIG. 4A illustrates one embodiment of the orientation of the read/write head 340 and the slider mover 342. In this embodiment, the slider mover 342 is spaced apart a relatively large separation distance 476 away from the read/write head 340. In alternative, non-exclusive examples, the separation distance 476 is at least approximately 10, 20, 30, 40, 50, 60, 70, 80 or 90 percent of a width 478 of the trailing edge 354 of the slider body 338. Stated in another fashion, for a slider body 338 having a width 478 of approximately 1 millimeter, the separation distance 476 is at least approximately 0.1, 0.2, 0.3, 0.4, 0.5, 0.6, 0.7, 0.8 or 0.9 millimeters.

High temperatures can degrade the performance of the read element 358 and reduce the operational life of the read element 358. With the present design, because of the relatively large separation distance 476, any heat generated by the slider mover 342 is less likely to degrade or influence the read element 358.

It should also be noted that in this embodiment, the read/write head 340 including the write element 356 and the read element 358 and the R/W bearing surface 360B are located on the opposite side of the roll axis 468 from the slider mover 342 and the mover bearing surface 360D. Stated another way, the read/write head 340 and the R/W bearing surface 360B are located on the OD side 350 of the roll axis 468 and the slider mover 342 and the mover bearing surface 360D are located on the ID side 348 of the roll axis 468. Alternatively, for example, the read/write head 340 and the R/W bearing surface 360B can be located on the ID side 348 of the roll axis 468 and the slider mover 342 and the mover bearing surface 360D can be located on the OD side 350 of the roll axis 468.

Additionally, both the slider mover 342 and the read/write head 340 are positioned away and offset from the roll axis 468. More specifically, the slider mover 342 is positioned a distance 480A away from the roll axis 468, and the read/write head 340 is positioned a distance 480B away from the roll axis 468. In alternative, non-exclusive embodiments, the distances 480A, 480B can be at least approximately 0.1, 0.2, 0.3, 0.4, or 0.5 millimeters.

In certain designs, as the distances 480A, 480B are increased, the range of adjustment of the head-to-disk spacing 470A is increased, and/or the amount of roll achievable with the slider mover 342 is increased.

The design of the slider mover 342 can vary. In one embodiment, the slider mover 342 deforms the slider body 338. For example, the slider mover 342 can include an electrical conductor, e.g. a coil, embedded in the slider body 338 that is electrically connected to the drive circuitry 18 (illustrated in FIG. 1) so that the drive circuitry 18 can activate and control the operation of the slider mover 342. With this design, the drive circuitry 18 can direct current through the electrical conductor to heat the slider body 338 and increase the temperature near the mover bearing surface 360D.

The slider mover 342 can be formed from a material having a relatively high electrical resistivity. The size, shape, composition, and/or geometry of the slider mover 342 can be designed to suit the performance characteristics of the drive 10. The slider mover 342 can be embedded and incorporated substantially entirely within the slider body near the trailing edge. Alternatively, the slider mover 342 can be positioned in other locations in the slider body and/or partly or entirely positioned outside the slider body.

In one embodiment, the slider mover 342 is not in direct electrical communication with the read/write head 340. Stated another way, the slider mover 342 is electrically isolated from the read/write head 340, nor is there any significant electrical coupling there between.

FIG. 4B is a simplified end view of a portion of the storage disk 16, the slider contact 462 of the suspension 232, and the slider assembly 24 with the slider body 338 in the rolled, second position 472. FIG. 4B illustrates that the increased temperature near the mover bearing surface 360D has caused a thermal deformation of the slider body 338 including the mover bearing surface 360D along the Z axis towards the storage disk 16. As a result thereof, the mover bearing surface 360D includes a protrusion 482.

In certain designs, the protrusion 482 on the mover bearing surface 360D increases the pressure at the mover bearing surface 360D thereby increasing the lift forces that are exerted on the mover bearing surface 360D. Because the slider mover 342 and the mover bearing surface 360D are shifted off of the roll axis 468, the increased lift force on the mover bearing surface 360D generates a moment 484 on the slider body 338 that causes the slider body 338 to roll about the roll point 466 thereby urging the read/write head 340 towards the storage disk 16 and the head-to-disk spacing 470B to decrease. Thus, the movement of the read/write head 340 and changes to the head-to-disk spacing 470B are achieved by rolling the slider body 338 relative to the suspension 232.

Generally speaking, for a given slider assembly 24 arrangement, as the heat generated by the slider mover 342 is increased, the size of the protrusion 482 is increased. Further, as the size of the protrusion 482 is increased, the lift of the mover bearing surface 360D is increased, the magnitude of the moment 484 is increased, and the amount of roll caused by the slider mover 342 is increased. With this configuration, the roll position of the slider body 338 and the head-to-disk spacing 470B can be precisely controlled by controlling the amount of current that is directed to the slider mover 342.

The precise relationship between amount of protrusion 482 and the resulting change in head-to-disk spacing 470 will depend upon many factors, including the design of the bearing surfaces 360 and the separation distance 476.

As discussed above, in certain embodiments, the read/write head 340 is positioned on the relatively small R/W bearing surface 360B. With this design, thermal expansion of the R/W bearing surface 360B caused by operation of the write element 356, otherwise known as write pole tip protrusion ("WPTP") does not significantly increase the lift on the R/W bearing surface 360B or significantly influence the roll angle of the slider body 338.

With this design, the slider mover 342 can be operated so that the moment 484 created by the protruded mover bearing surface 360D is greater than the moment created by the protruded R/W bearing surface 360B. As result thereof, the slider body 338 can be rolled in a controlled fashion before, during or after a write operation and a read operation.

It should be noted that in this embodiment, because of the separation distance 476, the actuation efficiency (S) of the slider mover 342 is decoupled from heating (T) of the read element 358. By de-coupling S and T, there is more flexibility in the design of the slider mover 342. For example, the electrical conductor can be designed to span substantially the entire width of the mover bearing surface 360D, if desired to create more lift and a larger roll moment.

Moreover, the electrical conductor could be designed to have a high electrical resistance and/or relatively higher power levels could be directed to the electrical conductor to get a larger actuation range and a faster time response (nm/sec) for undershoot compensation during a transition from a write operation to a read operation or overshoot during a transition from a read operation to a write operation.

Additionally, during manufacturing of the slider assembly 24, additional high CTE (Coefficient of Thermal Expansion) materials could be deposited close to the electrical conductor of the slider mover 342 to give larger thermal deformation of the mover bearing surface 360D per unit input power to the slider mover 342. In alternative, non-exclusive embodiments, relatively high CTE materials having a CTE of between approximately $3 \cdot 10^{-6}/^\circ$ C. to $50 \cdot 10^{-6}/^\circ$ C. could be used. Because, these high CTE materials are not deposited by the read/write head 340, the influence of WPTP on the R/W bearing surface 360B and the slider assembly 24 is not affected.

The slider body 338 could be designed such that the mover bearing surface 360D resides entirely on AlTiC thereby eliminating the sensitivity of the mover bearing surface 360D lift coefficient (and S) to alumina recession profile. The slider mover 342 and the associated high-CTE materials could be deposited very close to the AlTiC boundary to maximize AlTiC deformation and PTP Lift. The slider mover 342 and the associated high-CTE materials could even be deposited inside an etched out cavity or recess in the AlTiC during manufacturing of the slider body 338.

In another embodiment, the slider mover 342 can be another type of device that adjusts the surface profile and/or creates a protrusion 482 on the mover bearing surface 360D. For example, the slider mover 342 can include a piezoelectric element that alters the shape of the mover bearing surface 360D.

Still alternatively, the slider mover 342 can include any device that causes a controlled roll of the slider body 338. For example, electrostatic methods could be utilized.

The orientation of slider body 338 in the second position 472 can be varied. For example, the second position 472 can be a read position (D2) during rotation of the disk 16 in which the lift forces generated by the bearing surfaces 360 urge the slider assembly 24 away from the disk 16, the suspension 232 urges the slider assembly 24 towards the disk 16, and the slider mover 342 has rolled the slider body 338. In the read position (D2), the head-to-disk spacing 470B is relatively small, and the slider body 338 is rolled, e.g. the spacing between the OD side 350 and the disk 16 is less than the spacing between the ID side 348 and the disk 16. In the second position 472, for example, there can be a transfer of data between the read/write head 340 and the storage disk 16 or no data is currently being transferred.

The amount in which the slider mover 342 rotates the slider body 338 can be varied to suit the design of the other components of the disk drive 10. In alternative non-exclusive, embodiments, the slider mover 342 can rotate the slider body 338 at least approximately 0.1, 0.2, 0.4, 0.5, 1, 2, 5, 10, 20 or 30 microradians during movement between the first position 464 and the second position 472. Stated another way, the slider mover 342 can rotate the slider body 338 between approximately 0.1 and 2 microradians, between approximately 0.1 and 5 microradians, or between approximately 0.1 and 10 microradians during movement between the first position 464 and the second position 472. Generally speaking, more rotation allows for more actuation and larger adjustment range of the head-to-disk spacing 470B.

Stated in another fashion, in alternative non-exclusive, embodiments, the slider mover 342 can be used to adjust, change and reduce the head-to-disk spacing 470B at least approximately 0.1, 0.2, 0.4, 0.5, 1, 2, 5, 10, 20 or 30 nanometers during movement between the first position 464 and the second position 472. Stated in yet another way, the slider mover 342 can adjust and change the head-to-disk spacing 470B between approximately 0.1 and 2 nanometers, between approximately 0.1 and 5 nanometers, or between approximately 0.1 and 10 nanometers during movement between the first position and the second position.

It should also be noted, that the slider mover 342 can be used to precisely move the slider body 338 different amounts for different operations. FIG. 4C is a simplified end view of the portion of the storage disk 16, the portion of the suspension 232 and the slider assembly 24 with the slider body 338 rolled to the third position 474 that is intermediate the first position 464 and the second position 472. It should be noted that the protrusion 482 in FIG. 4C is smaller than the protrusion in FIG. 4B. As a result thereof, the slider body 338 in FIG. 4C has been rolled a smaller amount than the slider body 338 in FIG. 4B.

The orientation of slider body 338 in the third position 474 can be varied. For example, the third position 474 can be a write position (D3) during rotation of the disk 16 in which the lift forces generated by the bearing surfaces 360 urge the slider assembly 24 away from the disk 16, the suspension 232 urges the slider assembly 24 towards the disk 16, and the slider mover 342 has rolled the slider body 338. In the write position (D3), the head-to-disk spacing 470C is still relatively small, and the slider body 338 is rolled, e.g. the spacing between the OD side 350 and the disk 16 is less than the spacing between the ID side 348 and the disk 16.

In the third position 474, for example, there can be a transfer of data between the read/write head 340 and the storage disk 16 or no data is currently being transferred. As discussed above, during a write operation, the heat generated by the write element 356 causes the tip of the write element 356 to protrude towards the storage disk 16. As a result thereof, less rotation of the slider body 338 may be necessary during a write operation to achieve the desired head-to-disk spacing 470C than during a read operation.

While the particular slider assembly 24 and disk drive 10, as herein shown and disclosed in detail, are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A disk drive comprising:
   a suspension; and
   a slider assembly including a slider body with a flying side, a leading edge and a trailing edge, a read/write head and a slider mover both on the flying side on opposite sides of a roll axis extending from the leading edge to the trailing edge, the slider body being secured to the suspension in a fashion that allows the slider body to roll relative to the suspension, and wherein activation of the slider mover causes the slider body to roll in a controlled fashion relative to the suspension, while the read/write head and the slider mover remain fixed relative to each other and to the slider body.

2. The disk drive of claim 1 wherein activation of the slider mover selectively rolls the slider body from a first position to a second position.

3. The disk drive of claim 2 wherein the slider body rotates at least approximately 0.1 microradians during movement between the positions.

4. The disk drive of claim 2 wherein a head-to-disk spacing is greater when the slider body is in the first position than when the slider body is in the second position.

5. The disk drive of claim 1 wherein the slider body has a width and wherein the slider mover is spaced apart a separation distance from the read/write head and wherein the separation distance is at least approximately 10 percent of the body width.

6. The disk drive of claim 1 wherein the read/write head and the slider mover are offset from the roll axis.

7. The disk drive of claim 1 wherein slider body includes a R/W bearing surface and a spaced apart mover bearing surface, and wherein the read/write head is positioned near the R/W bearing surface and the slider mover is positioned near the mover bearing surface.

8. The disk drive of claim 7 wherein the slider mover causes deformation of the mover bearing surface.

9. The disk drive of claim 7 wherein the mover bearing surface is larger than the R/W bearing surface.

10. The disk drive of claim 7 wherein the mover bearing surface is at least approximately 10 percent larger than the R/W bearing surface.

11. The disk drive of claim 7 wherein the slider mover rolls the slider body to adjust a head-to-disk spacing of the read/write head.

12. A disk drive comprising:
    a suspension; and
    a slider assembly including a slider body having a flying side with a R/W bearing surface and a mover bearing surface that is spaced apart from the R/W bearing surface, the R/W bearing surface and mover bearing surface on opposite sides of a roll axis which extends from a leading edge to a trailing edge of the slider body, a read/write head on the flying side positioned near the R/W bearing surface, and a slider mover on the flying side positioned near the mover bearing surface, the slider body being secured to the suspension in a fashion that allows the slider body to move, and wherein activation of the slider mover causes the slider body to move relative to the suspension in a controlled fashion, while the read/write head and the slider mover remain fixed relative to each other and to the slider body.

13. The disk drive of claim 12 wherein activation of the slider mover selectively rolls the slider body relative to the suspension from a first position to a second position.

14. The disk drive of claim 13 wherein the slider body rotates at least approximately 0.1 microradians during movement between the positions.

15. The disk drive of claim 13 wherein a head-to-disk spacing is greater when the slider body is in the first position than when the slider body is in the second position.

16. The disk drive of claim 12 wherein the slider body has a width and wherein the slider mover is spaced apart a separation distance from the read/write head and wherein the separation distance is at least approximately 10 percent of the width.

17. The disk drive of claim 12 wherein the read/write head and the slider mover are offset from the roll axis.

18. The disk drive of claim 17 wherein the slider mover and the read/write head are positioned on opposite sides of the roll axis.

19. The disk drive of claim 12 wherein the slider mover causes deformation of the mover bearing surface.

20. The disk drive of claim 12 wherein the mover bearing surface is larger than the R/W bearing surface.

21. The disk drive of claim 12 wherein the mover bearing surface is at least approximately 10 percent larger than the R/W bearing surface.

22. The disk drive of claim 12 wherein the slider mover moves the slider body to control a head-to-disk spacing of the read/write head.

23. A disk drive comprising:
    a suspension; and
    a slider assembly secured to the suspension, the slider assembly including a slider body having a flying side, a leading edge, a trailing edge and a roll axis extending from the leading edge to the trailing edge, a read/write head and a R/W bearing surface positioned on the flying side on a first side of the roll axis, and a slider mover and a mover bearing surface positioned on the flying side on a second side of the roll axis wherein the first side is opposite to the second side of the roll axis, wherein activation of the slider mover changes the shape of the mover bearing surface, while the read/write head and the slider mover remain fixed relative to each other and to the slider body.

24. The disk drive of claim 23 wherein activation of the slider mover selectively rolls the slider body at least approximately 0.1 microradians.

25. The disk drive of claim 23 wherein the slider body has a body width and wherein the slider mover is spaced apart a separation distance from the read/write head and wherein the separation distance is at least approximately 10 percent of the body width.

26. The disk drive of claim 23 wherein the read/write head is positioned near the R/W bearing surface and the slider mover is positioned near the mover bearing surface.

27. The disk drive of claim 26 wherein the slider mover causes deformation of the mover bearing surface.

28. The disk drive of claim 26 wherein the mover bearing surface is larger than the R/W bearing surface.

29. The disk drive of claim 23 wherein the slider mover rolls the slider body to adjust a head-to-disk spacing of the read/write head.

30. A method for adjusting a head-to-disk spacing of a disk drive having a rotatable storage disk; a suspension; and a slider assembly including a slider body that is secured to the suspension along a roll axis extending from a leading edge to a trailing edge of the slider body, with a slider mover on a flying side of the slider body and on one side of the roll axis and a read/write head on the flying side but on the opposite side of the roll axis, the method comprising the step of:

selectively rolling the slider body in a controlled fashion relative to the storage disk to adjust the head-to-disk spacing, while maintaining the relative position of the read/write head and the slider mover to each other and to the slider body.

31. The method of claim 30 wherein the step of selectively rolling includes the step of activating a slider mover that selectively rolls the slider body relative to the suspension.

32. The method of claim 30 wherein the step of selectively rolling includes the step of selectively deforming a bearing surface that is offset from the roll axis of the slider body.

33. The method of claim 30 wherein the step of selectively rolling includes the step of rolling the slider body at least approximately 0.1 microradians.

34. A method for adjusting a head-to-disk spacing of a disk drive having a rotatable storage disk; a suspension; and a slider assembly including a slider body having a flying side with a roll axis extending from a leading edge and a trailing edge, the slider body having a R/W bearing surface on the flying side and a mover bearing surface on the flying side that is fixedly spaced apart from the R/W bearing surface on an opposite side of the roll axis from the R/W bearing surface, a read/write head positioned on the flying side near the R/W bearing surface, and a slider mover positioned on the flying side near the mover bearing surface, the slider body being secured to the suspension in a fashion that allows the slider body to roll in relation to the storage disk, the method comprising the step of:

selectively rolling the slider body by heating the slider mover to increase the mover bearing surface.

35. The method of claim 34 wherein the step of selectively rolling includes the step of precisely controlling an amount of current directed to the slider mover.

36. The method of claim 34 wherein the step of selectively rolling includes the step of rolling the slider body at least approximately 0.1 microradians.

\* \* \* \* \*